(12) United States Patent
Gu et al.

(10) Patent No.: US 7,813,137 B2
(45) Date of Patent: Oct. 12, 2010

(54) ROTATABLE MEMORY CARD WITH IMPROVED LOCKING MECHANISM

(75) Inventors: Hao Gu, Kunshan (CN); Qi-Sheng Zheng, Kunshan (CN); Zhi-Quan Mou, Kunshan (CN); Jia-Yong He, Kunshan (CN); Xiao-Hai Zhou, Kunshan (CN)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 775 days.

(21) Appl. No.: 11/787,811

(22) Filed: Apr. 18, 2007

(65) Prior Publication Data

US 2007/0243732 A1    Oct. 18, 2007

(30) Foreign Application Priority Data

Apr. 18, 2006    (CN) .......................... 2006 2 0072588

(51) Int. Cl.
*H05K 7/14* (2006.01)
(52) U.S. Cl. ........................................ 361/737; 361/755
(58) Field of Classification Search ................. 361/737, 361/727, 755, 752, 790, 797, 800
See application file for complete search history.

(56) References Cited

U.S. PATENT DOCUMENTS

| 6,890,188 | B1 | 5/2005 | Le |
| 6,944,028 | B1 | 9/2005 | Yu |
| 7,104,809 | B1* | 9/2006 | Huang ........................ 439/76.1 |
| 7,152,801 | B2* | 12/2006 | Cuellar et al. ............... 235/492 |
| 7,310,692 | B2* | 12/2007 | Miller et al. .................. 710/11 |
| 7,491,076 | B2* | 2/2009 | Gu et al. ..................... 439/217 |
| 2005/0230483 | A1 | 10/2005 | Miller |
| 2006/0084287 | A1 | 4/2006 | Miller |

* cited by examiner

*Primary Examiner*—Hung S Bui
(74) *Attorney, Agent, or Firm*—Wei Te Chung; Andrew C. Cheng; Ming Chieh Chang

(57) ABSTRACT

A memory card (100) includes a main body portion (1) and a rotatable portion (2) connected by a pair of hinges (3) to rotate around an axis extending across a width of the memory card. A conductive member (12) includes a base (121) retained in the main body portion (1) to form a SD card interface and an extension (122) extending beyond the main body portion to form a USB plug interface. The rotatable portion has a slot (2117) and a slider (22) movably received in the slot. The slider (22) includes a locking projection (2215) holding a distal end (123) of the extension at a closed position and sliding away the distal end to expose the second interface at an opened position.

20 Claims, 10 Drawing Sheets

ROTATABLE MEMORY CARD WITH IMPROVED LOCKING MECHANISM

CROSS-REFERENCE TO RELATED APPLICATIONS

Relevant subject matters are disclosed in a contemporaneously filed application with the same title, and are assigned to the same applicant and the same assignee with the instant invention.

BACKGROUND OF THE INVENTION

1. Field of the Invention

This invention generally relates to a memory card, and more particularly to a rotatable memory card.

2. Description of the Prior Art

Nowadays, memory cards, such as CF cards, MMC cards, SD cards, mini SD cards, MS cards and TF cards etc., have been widely used with personal computers, cellular telephones, personal digital assistants (PDAs), digital still cameras (DSCs) etc. to store large amounts of data. Memory cards of a same type may be interchanged in a complementary card slot designed to accept that type of the memory cards. However, the development of memory card standards has created different types of memory cards that are incompatible with each other in various degrees. A memory card made according to one standard is usually not compatible with a host designed to operate with a memory card of another standard.

The memory cards have been made to interface with a computer or other type of electrical devices through a Universal Serial Bus (USB) connector. These are especially convenient for users who have one or more USB connectors available on the front of their personal computers, particularly of a receptacle slot for one of the above standard memory cards is not present.

U.S. Patent Application Publication No. 2006/0084287 A1 discloses such a memory card comprising a stationary portion and a cover attached to the stationary portion by a pair of rigid hinges. The memory card comprises a first interface retained in the stationary portion and a second interface extending beyond the stationary portion along a longitudinal direction thereof. The first and second interfaces are adapted to mate with standard SD card slot and USB receptacle, respectively. The cover can be rotated with respect to the stationary portion approximately one-hundred eighty degrees between closed and opened positions. The cover defines a depression to receive the second interface at the closed position. Besides, in order to make the second interface stably received in the depression to prevent it from being exposed accidentally, the cover comprises a hook rigidly abutting against a distal end of the second interface at the closed position. However, the second interface may easily be damaged due to a long-term rigidly engagement between the hook and the second interface, thereby shorten the usage life of the memory card.

Hence, it is desired to have a memory card solving the problem above.

BRIEF SUMMARY OF THE INVENTION

Accordingly, an object of the present invention is to provide a memory card with an interface and an improved rotatable portion for reliable protection of the interface.

In order to attain the objective above, a memory card comprises a main body portion and a rotatable portion connected by a pair of hinges so that the rotatable portion can rotate around an axis extending across a width direction of the memory card. A conductive member includes a base retained in the main body portion with a plurality of first contacts to form a first interface and an extension extending beyond the main body portion with a plurality of second contacts to form a second interface. The rotatable portion comprises a receiving chamber for mating with the extension, a slot located at the back of the receiving chamber and a slider movably received in the slot. The slider comprises a locking projection holding a distal end of the extension at a closed position. In this condition, the memory card can be inserted into and removed from a first receptacle. When it is desired to insert the memory card into a second receptacle different from the first receptacle, the slider is movable in the slot along the width direction. The locking projection slides away from an inclined surface of the distal end of the extension. As a result, the rotatable portion can pivot around the axis to expose the second interface at an opened position. The engagement between the distal end of the extension and the locking projection is flexible via the movement of the slider along the width direction of the memory card, thereby the second interface can't be easily damaged.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT OF THE INVENTION

Figure 1:
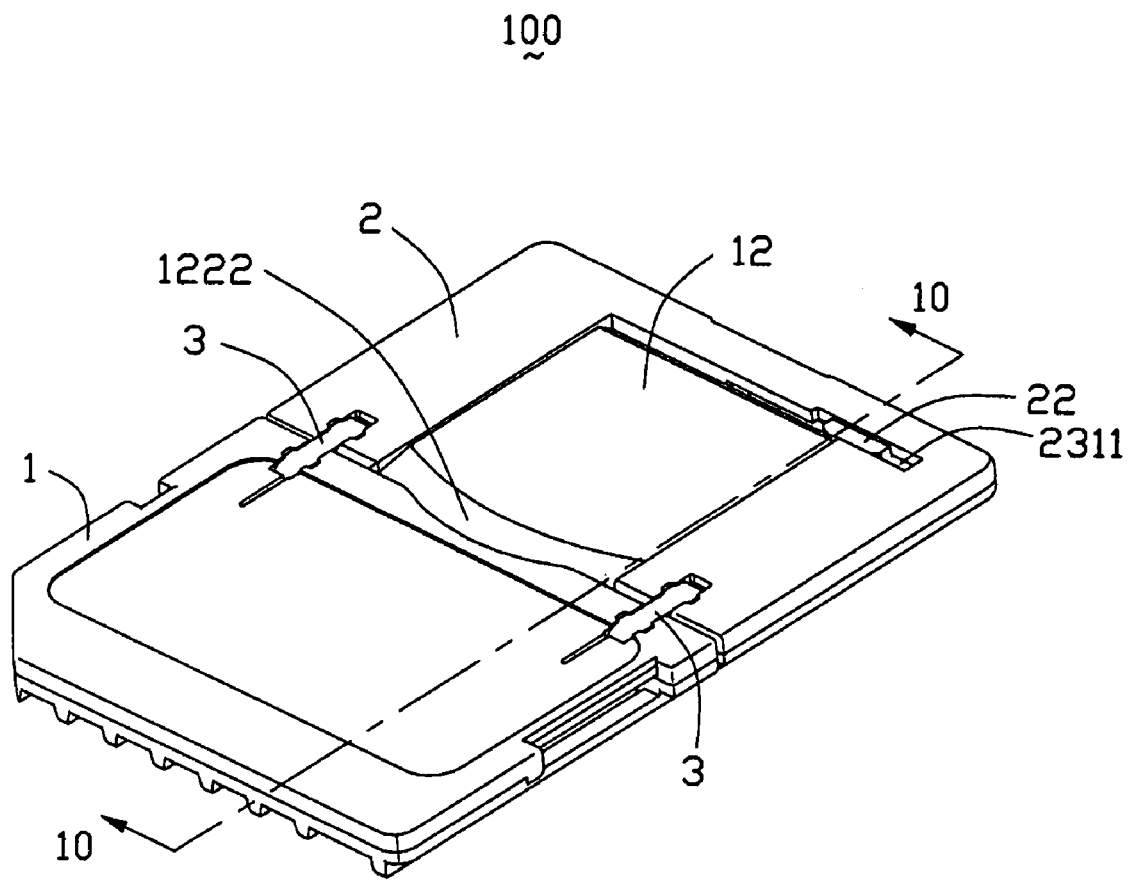
FIG. 1 is a perspective view of a memory card having a first and a second interfaces at a closed position, and with the second interface hide in a cover according to a preferred embodiment of the present invention.

Reference will now be made in detail to the preferred embodiment of the present invention.

Referring to FIGS. 1-4, a memory card 100 extends in a longitudinal direction and comprises a main body portion 1, a conductive member 12 with a base 121 retained in the main body portion 1 and a substantially rectangular shaped extension 122 extending beyond the main body portion 1, and a rotatable portion 2 connected by a pair of hinges 3.

The main body portion 1 comprises a first bottom cover 11 and a first top cover 13 covering the first bottom cover 11. The first bottom cover 11 defines a first receiving chamber 111 to receive the base 121 of the conductive member 12 and a plurality of rectangular shaped through holes 112 at a front end thereof. The through holes 112 are located along a width direction of the memory card 100 perpendicular to the longitudinal direction. A pair of first protrusions 113 each with a cross-shaped depression 114 defined therein (shown in FIG. 7) are located at a back end of the bottom cover 11. The first top cover 13 is configured to the first bottom cover 11 and comprises a pair of slits 131 corresponding to the depressions 114 for mating with the hinges 3.

Figure 5:
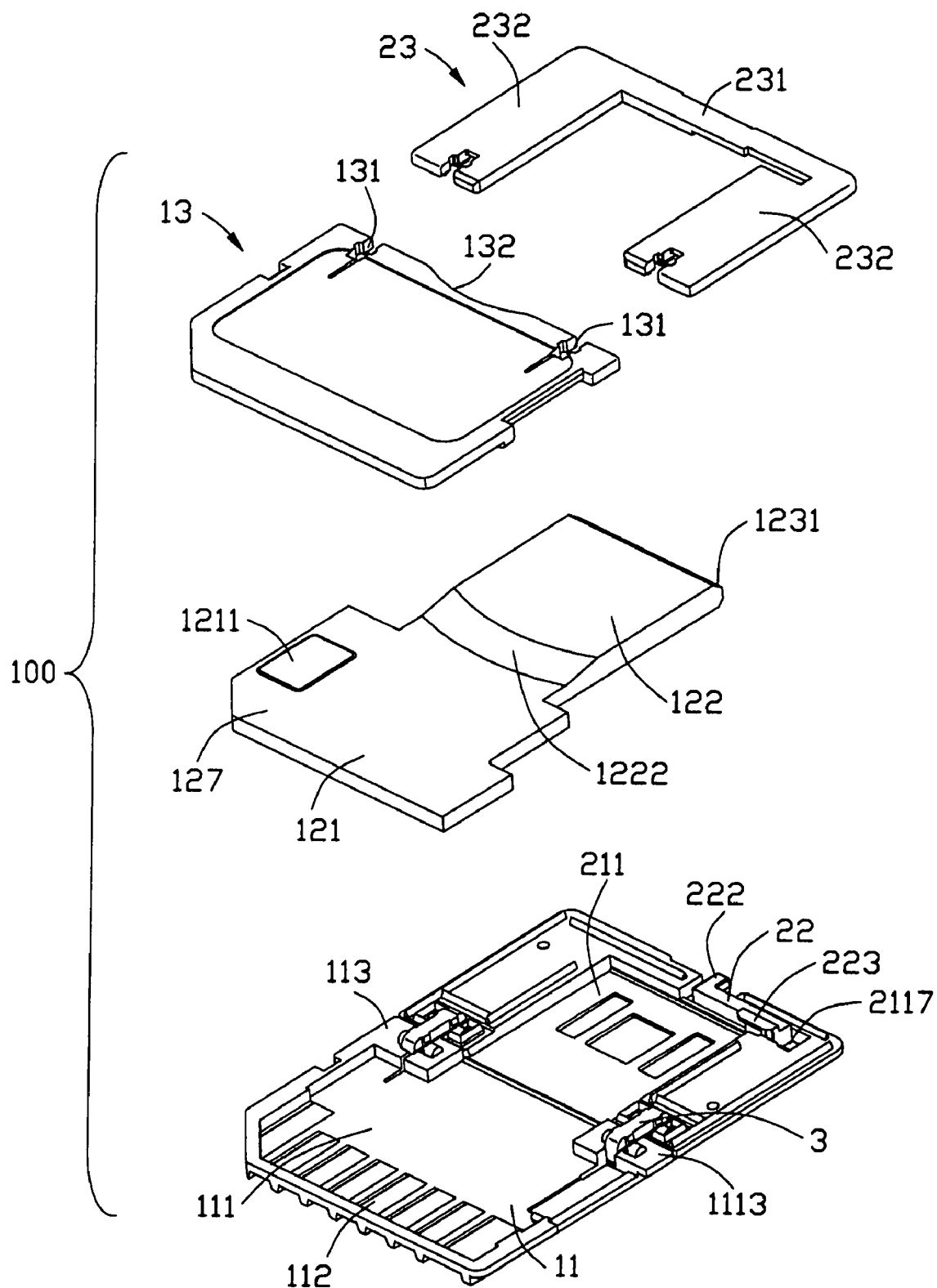
FIG. 5 is an exploded view of the memory card shown in FIG. 1.
Figure 6:
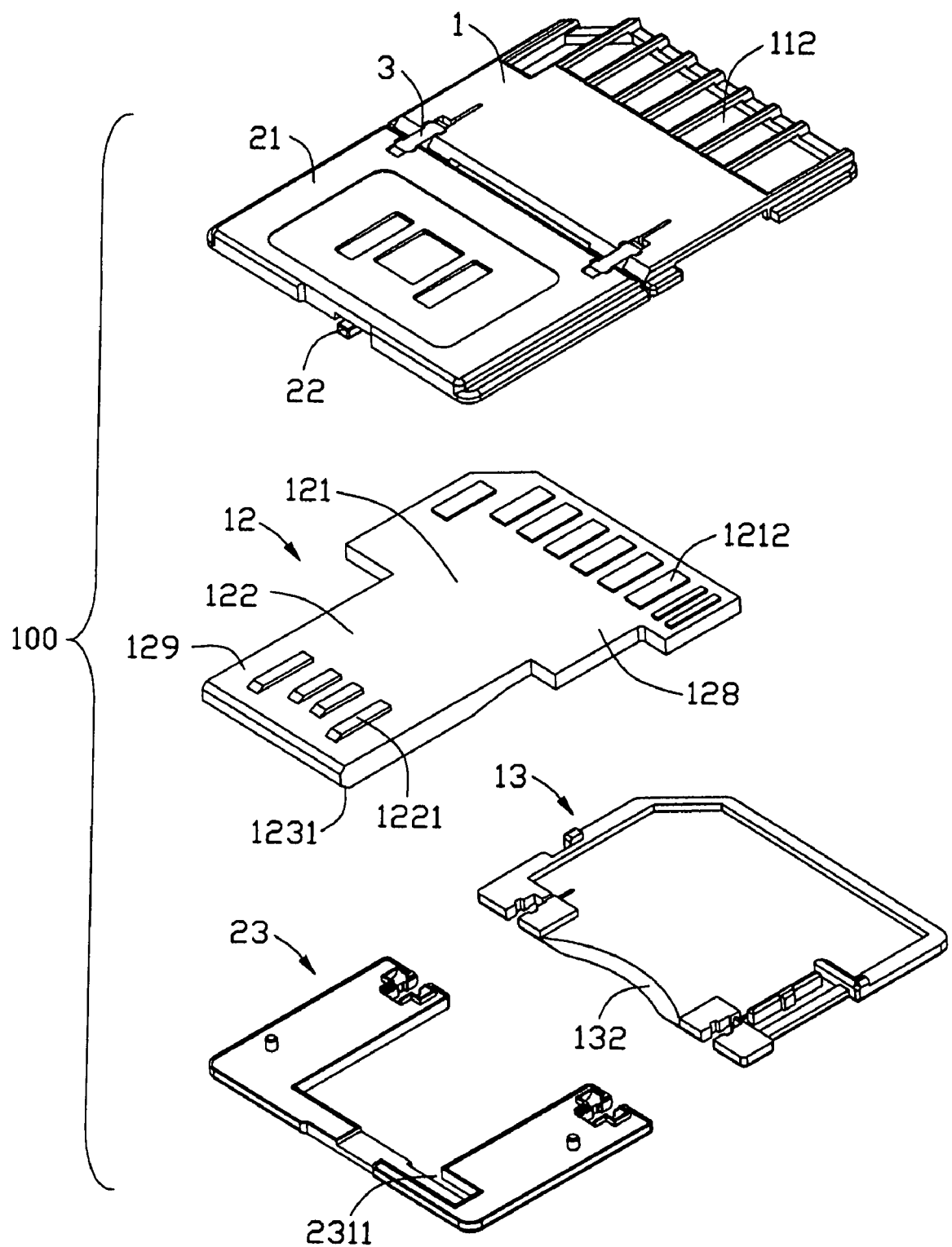
FIG. 6 is another exploded view of the memory card shown in FIG. 2.
Figure 10:
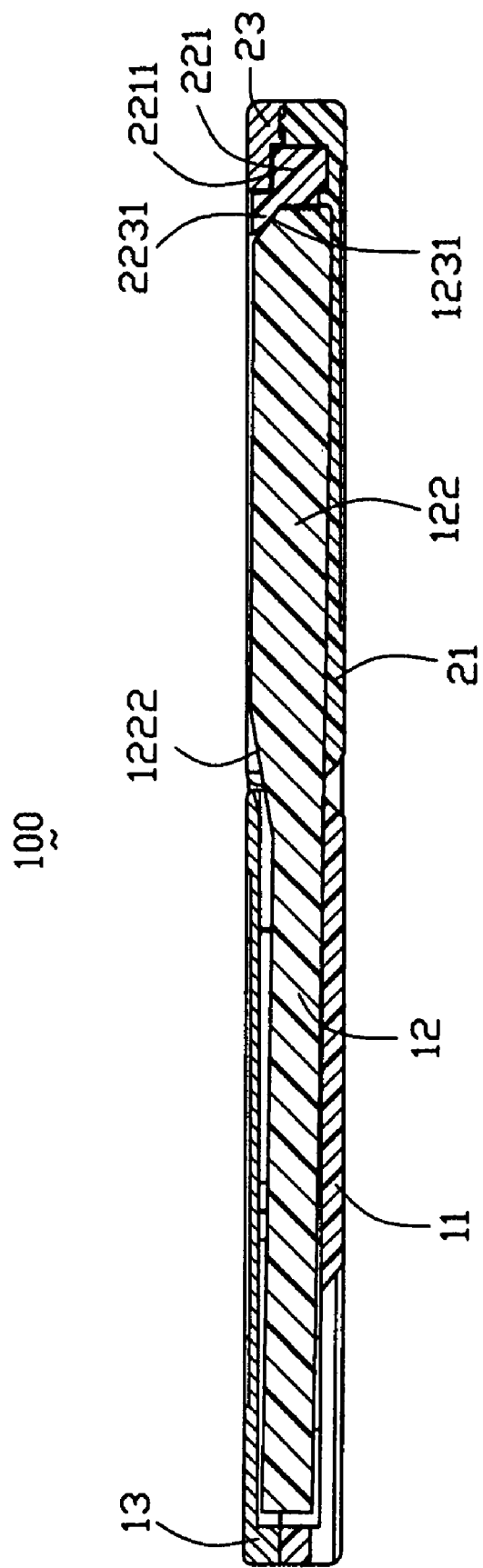
FIG. 10 is a cross-sectional view of the memory card taken along line 10-10 of FIG. 1.

Referring to FIGS. 5-6, the conductive member 12 in the preferred embodiment is a printed circuit board (PCB). The base 121 comprises a memory chip 1211 formed on a top surface 127 thereof and a plurality of first contacts 1212 formed a bottom surface 128 corresponding to the through holes 112 of the first bottom cover 11. The extension 122 integrally extends from the base 121 along the longitudinal direction wherein the extension 122 is narrower and thicker than the base 121. The extension 122 comprises a plurality of second contacts 1221 on a flat surface 129 coplanar with the bottom surface 128 of the base 121. The first and second contacts 1212, 1221 are positioned on the same side of the conductive member 12 of this example memory card 100 but they could alternately be placed on opposite sides. The extension 122 has a slant surface 1222 on another flat surface 126 opposite to the flat surface 129. The slant surface 1222 is adjacent to the base 121 and connects with the top surface 127 of the base 121. The first top cover 13 comprises a corresponding slant face 132 between the slits 131 for mating with the slant surface 1222. The extension 122 further comprises an inclined surface 1231 at a distal end thereof for mating with the slider 22 as shown in FIG. 10. The first and second contacts 1212, 1221 electrically connect with the memory chip 1211, respectively for signal transmission.

Figure 2:
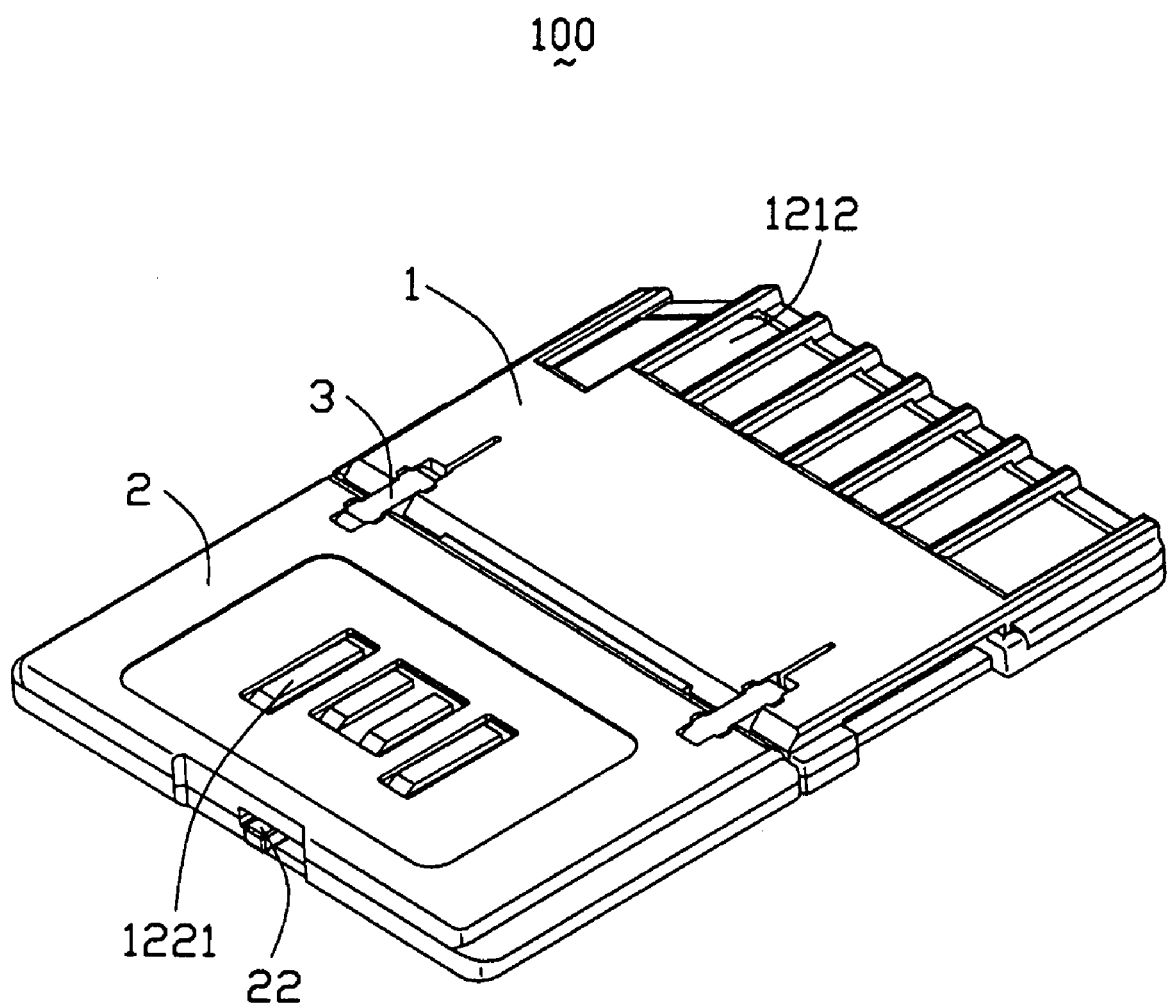
FIG. 2 is another perspective view similar to FIG. 1, while taken from another aspect.
Figure 3:
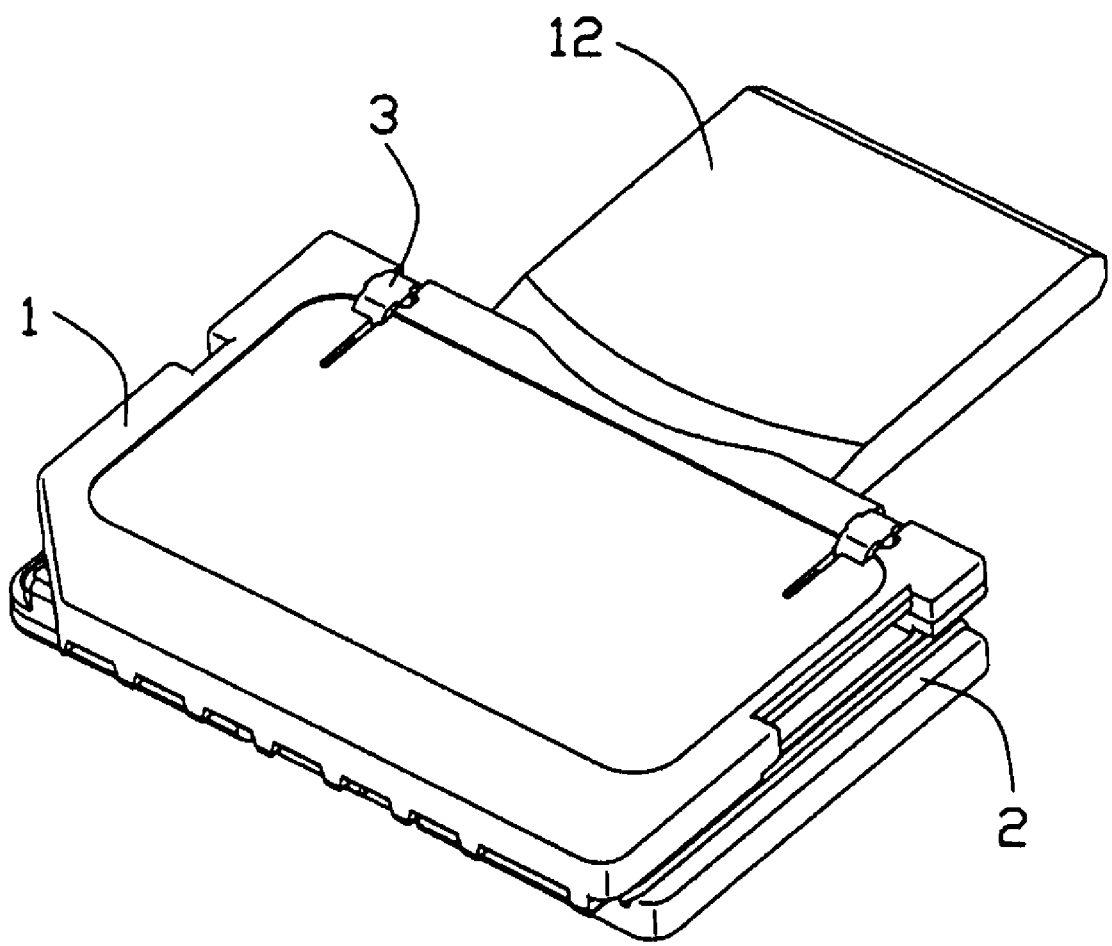
FIG. 3 is a perspective view of the memory card at an opened position with the second interface exposed outside.
Figure 4:
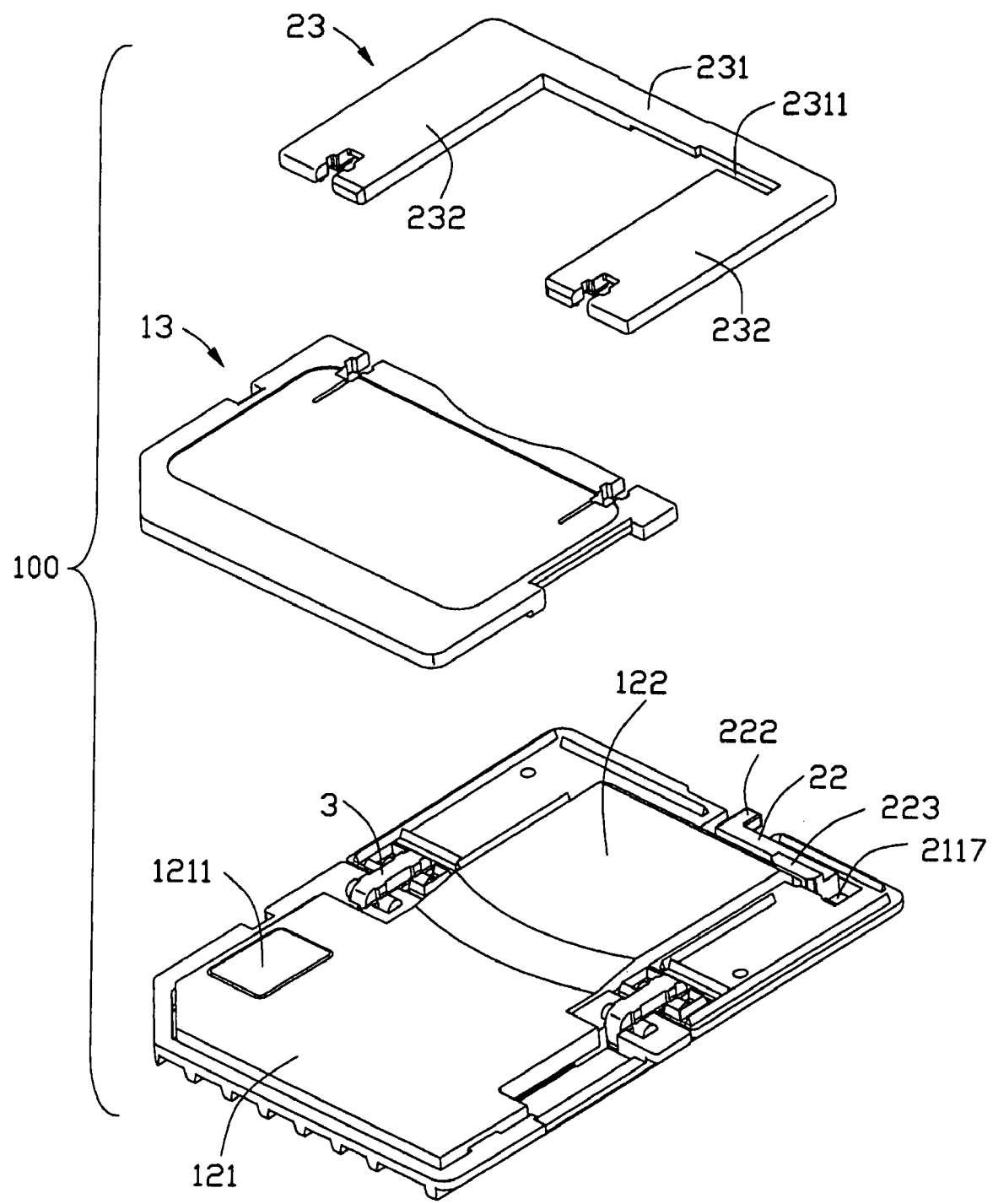
FIG. 4 is a perspective view of the memory card shown in FIG. 1 with a first and a pair of second covers removed therefrom.
Figure 7:
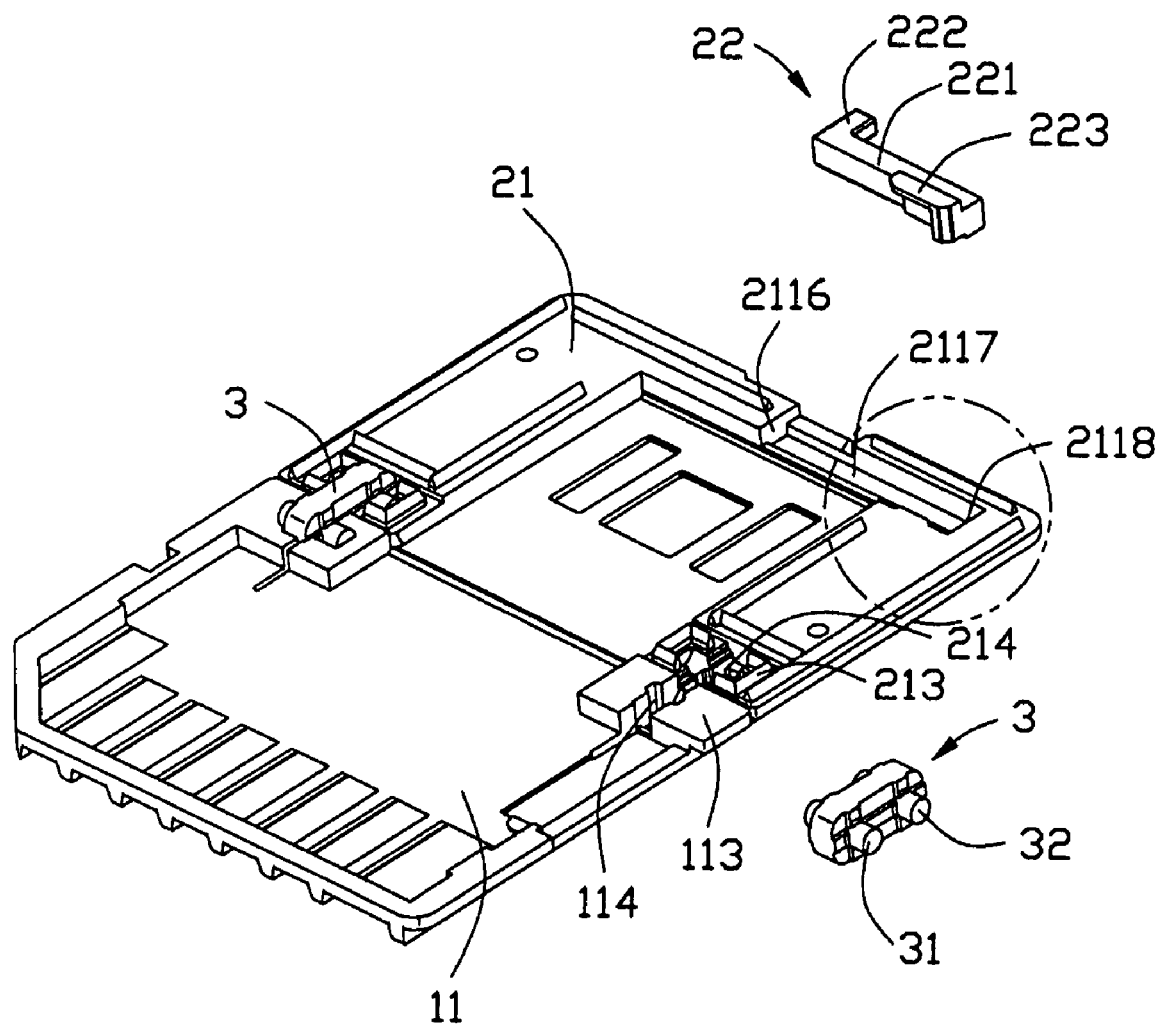
FIG. 7 is an exposed view of the memory card shown in FIG. 1 without the first and second covers as well as a PCB mounted thereon.
Figure 8:
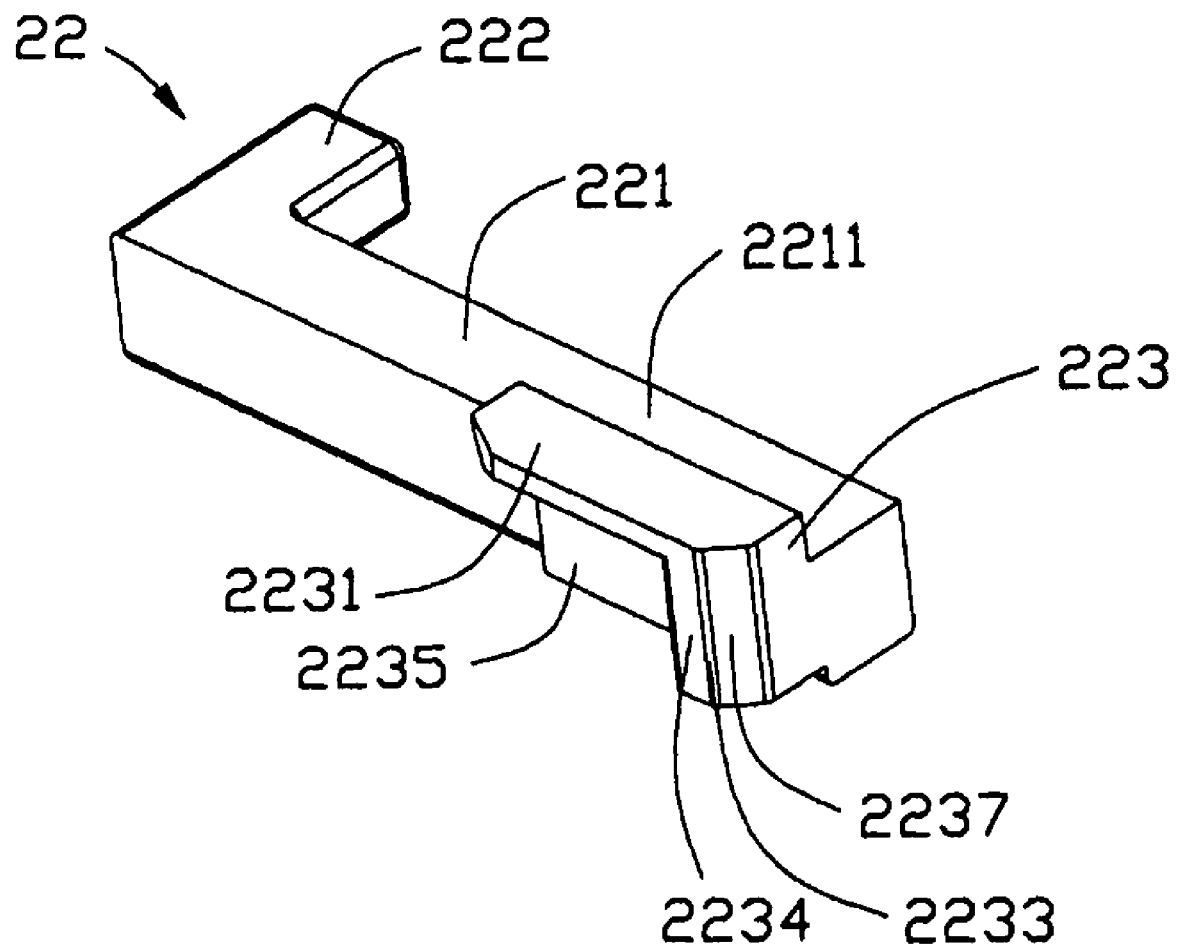
FIG. 8 is an enlarged view of a slider shown in FIG. 7.
Figure 9:
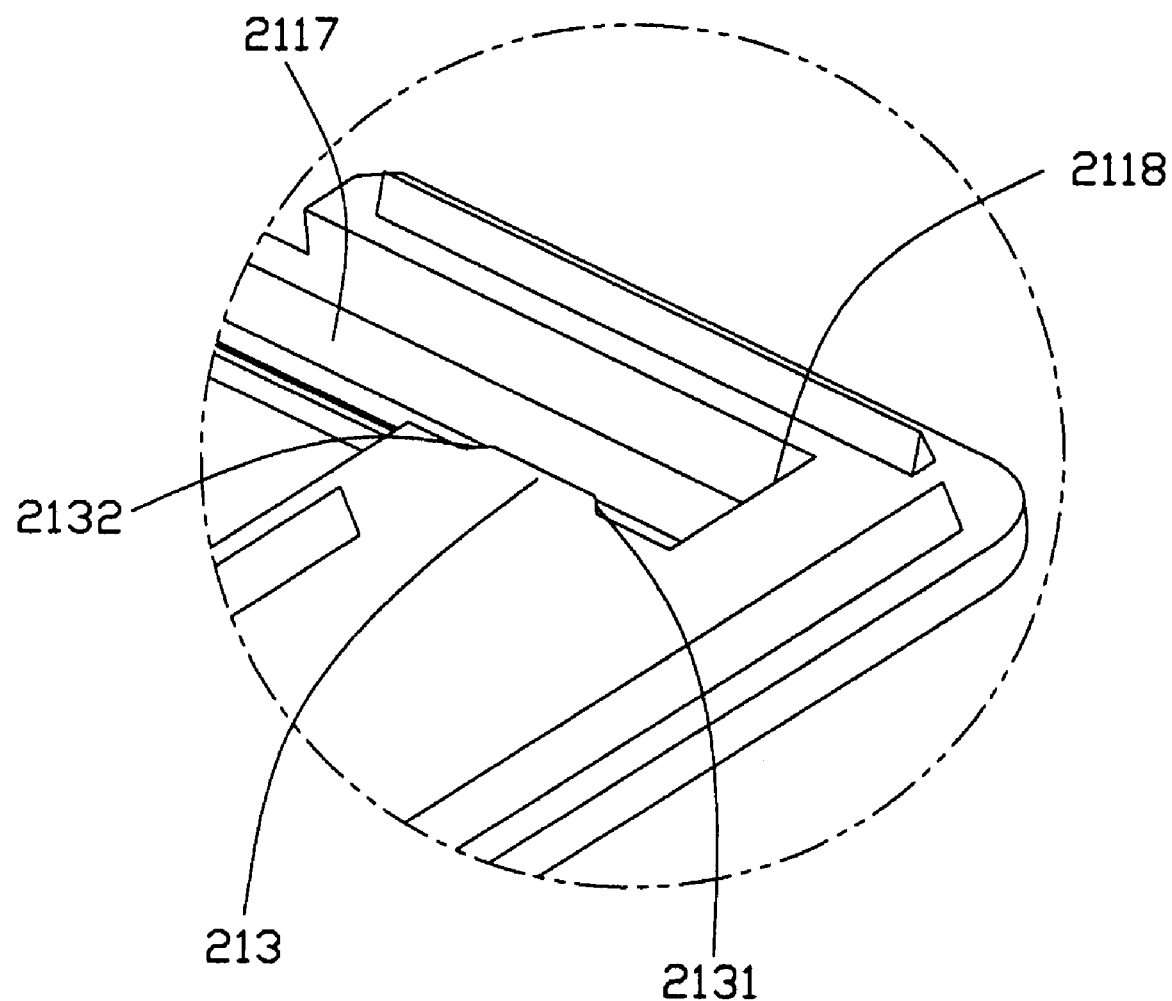
FIG. 9 is an enlarged view of a circle portion the memory card shown in FIG. 7.

Referring to FIGS. 7-9, in order to protect the second contacts 1221, a rotatable portion 2 is connected to the main body portion 11 so that it may be closed to cover the second contacts 1221 when they are not being used (the position of FIGS. 1-2) and opened to expose the second contacts 1221 when the extension 122 is inserted into a mating receptacle (the position of FIG. 3). The closed and opened positions are shown to be one-hundred eighty degrees apart. The rotatable portion 2 is attached to a back end surface (not labeled) of the main body portion 11 with the pair of respective hinges 3 and that allow for such rotation of the rotatable portion 2 by hand. The rotatable portion 2 comprises a second bottom cover 21, a slider 22 movably mounted on the second bottom cover 21 and a second top cover 23 covering the second bottom cover 21. The second bottom cover 21 comprises a second receiving chamber 211 for receiving the extension 122 and a slot 2117 at the back of the second receiving chamber 211 for mating with the slider 22. The slot 2117 extends along the width direction of the memory card 100 and forms opposite first and second stop walls 2116, 2118 for restricting the movement of the slider 22. The second bottom cover 21 further comprises a projection 213 extending into the slot 2117. The projection 213 has a pair of opposite inclined walls 2131, 2132 (shown in FIG. 9) for engaging with the slider 22. A pair of second protrusions 213 each with a cross-shaped depression 214 defined therein are disposed at a front end of the second bottom cover 21 corresponding to the first protrusions 113 of the first bottom cover 11.

Referring to FIG. 8, the slider 22 is substantially L-shaped and comprises a rectangular body portion 221, a drive portion 222 extending backwardly from one lateral side of the body portion 221, and a protrusion 223 extending forwardly from the other lateral side of the body portion 221. The drive portion 222 is perpendicular to the body portion 221 and exposes out of the second bottom cover 21 as shown in FIG. 2. The protrusion 223 comprises a locking projection 2231 projecting upwardly from a top face 2211 of the body portion 221 and a vertical engaging portion 2233 extending downwardly from the locking projection 2231 with a depression 2235 formed by the engaging portion 2233 and the locking projection 2231. The engaging portion 2233 comprises a first slant wall 2234 in the depression 2235 and a symmetrical second slant wall 2237 opposite to the first slant wall 2234.

The second top cover 23 comprises a rear portion 231 and a pair of side portions 232 extending from lateral sides of the rear portion 231. The rear portion 231 defines an opening 2311 corresponding to the locking projection 2231 so that the locking projection 2231 can slide in the opening 2311.

Each hinge 3 comprises a pair of first and second column-shaped pivots 31, 32 received in the depressions 114, 214, respectively. During movement of the rotatable portion 2 between its closed and opened positions, the hinge 3 can rotate about a first and a second axises extending across the first and second pivots 31, 32, respectively parallel to the width direction of the memory card 100.

In assembly, the slider 22 is assembled to the slot 2117 of the second bottom cover 21. The first and second bottom covers 11, 21 are connected by the pair of hinges 23 with the first and second pivots 31, 32 received in the depressions 114, 214, respectively, as shown in FIG. 5. The conductive member 12 is mounted to the first and second bottom covers 11, 21. The base 121 and the extension 122 are received in the first and second receiving chambers 111, 211, respectively. The first contacts 1212 expose outside through the through holes 112 of the first bottom cover 11. The locking projection 2215 holds the distal end of the extension 122 so that the extension 122 can be retained in the second receiving chamber 211, which will be detailed hereinafter. The first and second top covers 13, 23 are assembled to the first and second bottom covers 11, 21, respectively.

The extension 122 with the plurality of second contacts 1221 defined thereon is a USB plug which is compatible with the USB specifications. The main body portion 11 with the base 121 of the conductive member 12 retained therein accords to an interface of the SD card standard, but its length is shortened so that the overall length of the memory card 100, with the rotatable portion 2 covering the USB plug at the closed position, accords to standard length of the SD card.

In use, when the rotatable portion 2 is closed, part of the distal end of the extension 122 is received in the depression 2235. The drive portion 222 and the second slant wall 2237 abut against the first stop wall 2116 and the inclined wall 2132 of the projection 213, respectively. The locking projection 2231 covers the inclined surface 1231 of extension 122 so that the rotatable portion 2 can't rotate. In this condition, the memory card 100 can be used as any SD card the same as if the USB plug did not exist. The memory card 100 can be inserted into and removed from receptacles of host devices that follow the SD card standard. However, when it is desired to insert the memory card 100 into a USB receptacle, a user can drive the drive portion 222 along the width direction of the memory card 100. The slider 22 and the locking projection 2231 slide in the slot 2217 and the opening 2311, respectively. The second slant wall 2237 abuts against the other inclined wall 2132 of the projection 213. The slider 22 moves from the first stop wall 2116 to the second stop wall 2118 and the slider 22 slides away from the inclined surface 1231. In this condition, the first slant wall 2234 mates with the inclined wall 2131 of the projection 213. As a result, the rotatable portion 2 is opened to expose the extension 122 and the second contacts 1221. According to the preferred embodiment of the present invention, when the rotatable portion 2 pivots around corresponding axises, the engagement between the distal end of the extension 122 and the locking projection 2215 is flexible via the movement of the slider 22 along the width direction of the memory card 100. Because the flexible engagement between the distal end of the extension 122 and the locking projection 2215, the USB plug can't be easily damaged so that the usage of the memory card 100 is prolonged.

Various other details of the embodies can certainly be further altered so long as the contact structure at one end of the memory card confirms to one standard and the contact structure at the other end conforms to a second standard. In other words, the first interface of the memory card is not limited to use with the SD card interface, such as one of the other memory cards described above can be utilized instead. Besides, the second interface is not limited to use with the USB plug, such as an IEEE-1394 plug and even other memory card interface can be instead too.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A memory card, comprising:
    a main body portion;
    a conductive member comprising a base retained in the main body portion with a plurality of first contacts defined thereon to form a first interface, and an extension extending beyond the main body portion with a plurality of second contacts to form a second interface; and
    a rotatable portion rotatably connected to the main body portion, the rotatable portion comprising a slot and a slider movably received in the slot, the slider comprising a locking projection, the locking projection engaging with a distal end of the extension at a closed position where the second interface is protected in the rotatable portion, and the locking projection disengaging from the distal end of the extension to leave the rotatable portion rotating away from the second interface and thus the second interface being exposed outside.

2. The memory card according to claim 1, wherein the first interface is a standard memory card interface and the second interface is a universal serial bus (USB) or IEEE-1394 interface.

3. The memory card according to claim 1, wherein the locking projection disengages from the distal end of the extension in a way that the locking projection slides away from the distal end.

4. The memory card according to claim 1, wherein the rotatable portion comprises a bottom cover with the slot defined therein, the slider comprising a body portion movable linearly in the slot.

5. The memory card according to claim 4, wherein the locking projection protrudes forwardly from the body portion, the rotatable portion comprising a top cover mating with the bottom cover, and wherein the top cover defines an opening to receive the locking projection.

6. The memory card according to claim 4, wherein the distal end of the extension comprises an inclined wall, the locking projection integrally extending forwardly from the body portion to abut against the inclined wall at the closed position.

7. The memory card according to claim 4, wherein the bottom cover comprises a projection extending into the slot to hold the slider at the closed position.

8. The memory card according to claim 7, wherein the projection comprises an inclined surface, the slider comprising an engaging portion having a slant surface abutting against said inclined surface.

9. The memory card according to claim 8, wherein the projection comprises another inclined surface opposite to said inclined surface, the engaging portion comprising another slant surface opposite to said slant surface and abutting against the another inclined surface when the extension is exposed outside.

10. The memory card according to claim 1, wherein the slider comprises a drive portion exposed outside of the rotatable portion, the drive portion being drove by an outer force to make the slider sliding in the slot.

11. The memory card according to claim 1, wherein the slot extends along a width direction of the memory card.

12. The memory card according to claim 1, wherein the rotatable portion is connected to the main body portion by a pair of double-axis hinges, the hinges being rotatable around one axis on the main body portion and the other axis on the rotatable portion.

13. A memory card, comprising:
    a main body portion;
    a conductive member comprising a base retained in the main body portion with a plurality of first contacts defined thereon to form a first interface, and an extension extending beyond the main body portion with a plurality of second contacts to form a second interface, and wherein the extension is narrower than the base; and
    a cover rotatably connected to the main body portion, the cover comprising a slot and a slider selectively movable in the slot between a first position and a second position, the slider comprising a locking portion, the locking portion engaging with a distal end of the extension at the first position where the second interface is protected in the cover, and the locking portion disengaging from the distal end to leave the cover rotating away from the second interface and thus the second interface being exposed outside at the second position.

14. The memory card according to claim 13, wherein the slot extends along a width direction of the memory card.

15. The memory card according to claim 13, wherein the extension comprises a slant surface connecting with the base, the main body portion comprising a slant face to mate with said slant surface of the extension.

16. The memory card according to claim 13, wherein a thickness of the extension is less than that of the base.

17. A transformable memory card comprising:
    a shielding device including two juxtaposed first and second sections linked to each other under a mutual rotatable relationship with each other; and
    a conductive member associatively embedded in the shielding device, and defining a first region located in the first section and having first conductive traces thereon, and a second region located in the second section and having second conductive traces thereon under a condition that both of said first conductive traces and said second conductive traces are exposed to an exterior when said shielding device is in a flat manner;

wherein the second region is smaller than the first region in a transverse direction, and the second section is allowed to rotate to a position where the second region is essentially fully exposed to an exterior; wherein the second section includes oppositely assembled top and bottom covers commonly receiving therein a moveable locker which is moved between a locked position where said locker is engaged with the second region so as not to allow the second section to rotate, and an unlocked position where said locker is disengaged from the second region so as to allow the second section to rotate.

18. The memory card as claimed in claim 17, wherein a moveable controlling device is exposed on the shielding device and moveable between two positions so as to determine whether the second section is allowed to be rotated relative to the first second or not.

19. The memory card as claimed in claim 17, wherein the second section is essentially fully folded against the first section.

20. The memory card as claimed in claim 17, wherein in use with corresponding external connectors, the first region is required to accompany the first section while the second region is not required to accompany the second section.

* * * * *